United States Patent [19]

Pratt

[11] 4,114,442
[45] Sep. 19, 1978

[54] TEMPERATURE MONITORING SYSTEM

[75] Inventor: Wayne L. Pratt, Richardson, Tex.

[73] Assignee: Avicon Development Group, Richardson, Tex.

[21] Appl. No.: 720,406

[22] Filed: Sep. 3, 1976

[51] Int. Cl.$^2$ .......................... G01K 7/04; G01K 7/14
[52] U.S. Cl. ....................................... 73/341; 73/346
[58] Field of Search .................. 73/341, 346; 364/557; 340/413

[56] References Cited

U.S. PATENT DOCUMENTS

| | | | |
|---|---|---|---|
| 2,987,704 | 6/1961 | Gimple | 364/557 |
| 3,101,617 | 8/1963 | Brinson | 73/341 |
| 3,138,957 | 6/1964 | Brunson | 73/341 |
| 3,272,012 | 9/1966 | Seney | 73/341 |
| 3,459,925 | 8/1969 | Goosey et al. | 73/341 |
| 3,866,166 | 2/1975 | Kerscher | 340/413 |
| 3,964,302 | 6/1976 | Gordon | 340/413 |

Primary Examiner—S. Clement Swisher

Attorney, Agent, or Firm—Richards, Harris & Medlock

[57] ABSTRACT

The specification discloses a temperature monitoring system for monitoring thermal operating characteristics of aircraft engines. The system includes a plurality of temperature sensors located in different temperature monitoring zones within the aircraft engine to produce electrical sensor output signals proportional to the temperature of the corresponding zones. The temperature monitoring system further includes circuitry for automatically and sequentially scanning the sensor output signals. An electronic processor generates temperature difference signals representing the temperature difference between the hottest and coldest scanned sensor output signals. A visual display displays the generated temperature difference signal, the number of the temperature monitoring zone being monitored and the temperature of the hottest temperature monitoring zone. The system thus enables the aircraft operator to accurately and quickly observe the thermal operating characteristics of the aircraft's engine.

24 Claims, 7 Drawing Figures

TEMPERATURE MONITORING SYSTEM

FIELD OF THE INVENTION

This invention relates to monitoring systems, and more particularly to a temperature monitoring system for automatically and sequentially monitoring the temperature of a plurality of zones within an aircraft engine.

THE PRIOR ART

Engine operating temperatures are of critical importance in the operation of an aircraft. The engine's operating temperatures not only relate to the efficiency of the fuel combustion process, but also bear upon the amount of engine wear. Two temperatures in particular are important in the operation of aircraft engines. Exhaust gas temperatures indicate the efficiency of the combustion process and the degree of wear of combustion related components. Cylinder head temperature reflects the effect of engine wear, baffling efficiency, air speed, altitude and power settings. Typically, exhaust gas temperatures are utilized in adjusting the fuel-air ratio to the cylinders of an aircraft engine.

Previously developed aircraft temperature monitoring devices have only provided for the monitoring of engine temperatures with a manually switched exhaust gas temperature or cylinder head temperature analyzer. Such prior devices are useful only when the aircraft pilot has sufficient time to properly and manually switch the monitor from one sensor zone to another and record the temperature data. These prior devices have generally not operated uniformly over the entire flight, but usually perform only at higher temperatures corresponding to cruise or climb conditions. In addition, anomalies of operation cannot always be detected using such prior monitoring devices, since the monitoring is random and under the manual control of the pilot.

A need has thus arisen for an aircraft temperature monitoring system which will automatically and sequentially monitor various temperature zones of an aircraft engine to provide continuous temperature information to the aircraft pilot. Moreover, a need has arisen for a temperature monitoring system which can provide a visual display of diagnostic data eliminating the need for pilot calculations. A need has further arisen for a temperature monitoring system to continuously and automatically monitor and alternately display exhaust gas temperature, cylinder head temperature and turbine inlet gas temperature data.

SUMMARY OF THE INVENTION

In accordance with the present invention, a temperature monitoring system and method are presented which enable the automatic and continuous monitoring of various temperature monitoring zones within an aircraft engine and which provides diagnostic information to the aircraft pilot. When operated, the present temperature monitoring system displays the cylinder member of the hottest operating cylinder, the hottest exhaust gas temperature, cylinder head temperature or turbine inlet gas temperature and the difference between the hottest and coldest temperature of the zone being monitored.

In accordance with the present invention, a monitoring device for monitoring thermal operating characteristics of an aircraft engine includes a plurality of temperature sensors. Each of the temperature sensors is located in a different temperature monitoring zone within the engine to produce electrical sensor output signals proportional to the temperature of the corresponding zones. Circuitry is provided for automatically and sequentially scanning and detecting the sensor output signals. The system further includes an electronic processor for generating a temperature difference signal representing the temperature difference between the hottest and coldest scanned sensor output signals. Visual displays are also included for displaying the generated temperature difference signal, the temperature of the hottest zone being monitored and the number of the hottest zone being monitored.

DESCRIPTION OF THE DRAWINGS

For a more complete understanding of the present invention and for further objects and advantages thereof, reference is now made to the following detailed description taken in conjunction with the accompanying drawings in which.

DESCRIPTION OF THE PREFERRED EMBODIMENT

Figures 1, 2, 7:
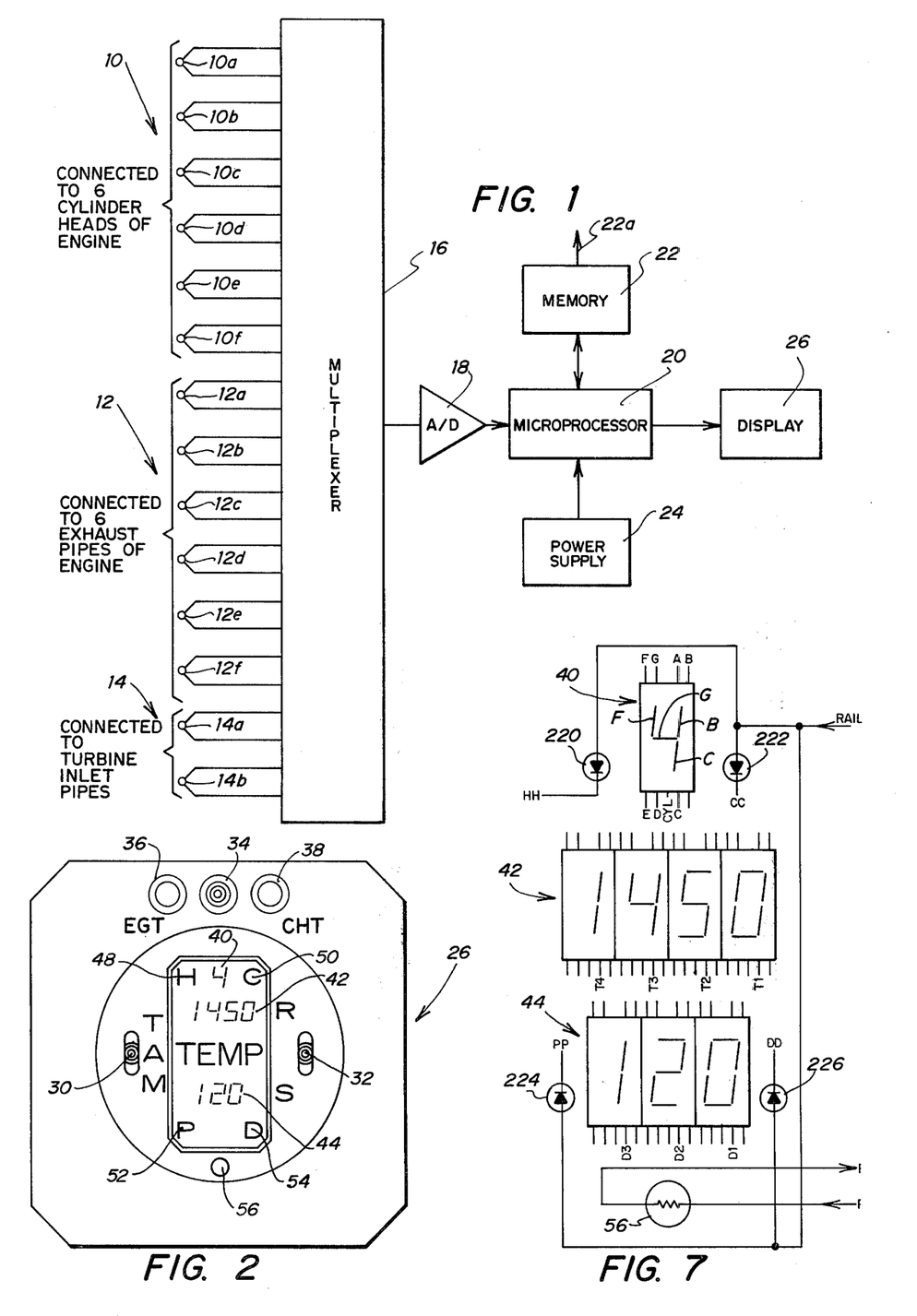
FIG. 1 is a block diagram of the temperature monitoring system of the present invention.
FIG. 2 is an illustration of the front panel display of the present temperature monitoring system.
FIG. 7 is a schematic diagram of a portion of the display circuitry shown in the block diagram of FIG. 1.

Referring to FIG. 1, a block diagram of the present temperature monitoring system is illustrated. The temperature monitoring system comprises a plurality of sensor groups, identified collectively by the numerals 10, 12 and 14. Sensor group 10 comprises sensors 10a–10f, which comprise thermocouples disposed in the conventional manner at the heads of six cylinders of an aircraft engine. Sensor group 12 comprises sensors 12a–12f, which comprise thermocouples disposed in the conventional manner at the exhaust pipes of six cylinders of an aircraft engine. The third group of sensors 14 comprise sensors 14a and 14b, which include thermocouples disposed in the conventional manner at the turbine inlet pipes of an aircraft engine.

The number of sensors utilized in each sensor group 10, 12 and 14 is dependent upon the type of aircraft engine being monitored. For example, the temperature monitoring system of the present invention can be utilized to monitor engines having six cylinders, as shown in FIG. 1 or utilized to monitor an engine having four, eight or fourteen cylinders. While in the preferred embodiment, three sensor groups are utilized, it is understood that the temperature monitoring system of the present invention can operate with a single sensor group or any combination of sensor groups 10, 12 and 14.

The thermocouples of sensor group 10 generate an output voltage signal proportional to the temperature of the engine cylinder heads. The thermocouples 12a–12f generate an output voltage signal proportional to the temperature of the exhaust gas of the cylinders of the aircraft engine being monitored. And thermocouples 14a and 14b generate an output voltage signal proportional to the temperature of the turbine inlet gas.

The output signals of the sensors 10, 12 and 14 are applied to a multiplexer 16. Multiplexer 16 continuously and sequentially scans at a high rate the outputs of each of the sensors 10, 12 and 14. The scanned analog output information is then fed into an analog-to-digital converter 18. The resulting digital temperature information is applied to a microprocessor 20 and memory circuitry 22. The microprocessor 20 computes which cylinder or cylinder head is presently operating at the highest temperature, the difference between the hottest and coldest cylinder head or exhaust gas temperature and performs several diagnostic functions. Memory 22 includes a random access memory circuit which stores temperature values utilized in the calculations performed by the microprocessor 20. Power is supplied to the microprocessor and memory circuitry from a power supply 24. The output of the microprocessor is then applied to a display 26 for visually displaying temperature and diagnostic information to the operator of the aircraft. Temperature data with the sensor number from all sensors are serially written out from the output port 22a.

Referring now to FIG. 2, the display 26 of the temperature monitoring system is illustrated. The display 26 includes a mode switch 30 for controlling the automatic or manual operation of the temperature monitoring system. The mode switch 30 also places the monitoring system in the turbine mode of operation to monitor the turbine inlet gas temperature. A second mode switch 32 controls cylinder selection, temperature storage and reset functions to be subsequently described. A select switch 34 is utilized to control the display mode, to either display exhaust gas temperature or cylinder head temperature information on display 26. When the select switch 34 is positioned to the left, a lamp 36 will be illuminated to indicate that display 26 is displaying exhaust gas temperature information. If the select switch 34 is positioned to the right, a lamp 38 will be illuminated to indicate that cylinder head temperature information is being displayed on display 26. Alternating exhaust gas and cylinder head temperature information is displayed by display 26 when the select switch 34 is positioned in the center position as shown in FIG. 2. In this alternating mode of operation, lamps 36 and 38 will be alternately illuminated to designate whether exhaust gas or cylinder head temperature are being displayed on display 26.

Display 26 further includes a display 40 to display a cylinder number. The cylinder number displayed by display 40 represents in the exhaust gas temperature mode of operation either the hottest cylinder head temperature or the temperature of the cylinder head being observed. In the turbine mode of operation, display 40 will display a "[" to indicate the left turbine is being monitored, "]" to indicate the right turbine is being monitored and "⊔" to indicate that an auxiliary temperature is being monitored.

Located below display 40 is a four digit temperature display 42. Depending upon the monitoring system's mode of operation, display 40 will display either the exhaust gas temperature of the hottest cylinder, the cylinder head temperature of the hottest cylinder, the exhaust gas temperatures of each cylinder, the cylinder head temperatures of each cylinder, turbine inlet gas temperature or auxiliary temperature.

A third temperature display comprises a three digit display 44. Display 44 will indicate, depending upon the system's mode of operation, the exhaust gas temperature difference between the coldest and hottest operating cylinders, the temperature difference between the hottest and coldest cylinder heads, the temperature difference between the exhaust gas temperature of the hottest cylinder and a preselected reference temperature, the temperature difference between the cylinder having the hottest cylinder head and a predetermined reference temperature and the temperature difference between the right and left turbine inlet gases.

The display 26 also includes alarm indicators 48 and 50. Alarm indicator 48, "H", when illuminated indicates that the hot threshold has been exceeded. The alarm indicator 50, "C", indicates that at least one temperature value of the cylinders being monitored is less than one-half the magnitude of the hottest cylinder for the mode of operation being displayed. Alarm indicator 50 functions to indicate a cold threshold has been exceeded. Alarm indicator 50 also functions to indicate that the coldest temperature has dropped below a reference temperature minus twice the difference between the hottest temperature and the reference temperature in the automatic mode of operation to be subsequently described. This indicator detects an overall shift in the temperature pattern. While in the preferred embodiment the alarms have been indicated as light sources, in the alternative, auditory alarms can be utilized.

An indicator 52, "P", and indicator 54, "D", when illuminated indicate the character of the information being displayed by display 44 which will be subsequently described. Display 26 further includes an ambient light sensor 56, which monitors the external light present in the aircraft cabin to control the intensity of the displays 40, 42, 44, 48, 50, 52 and 54.

The operation of the temperature monitoring system of the present invention will now be discussed. For simplicity of discussion, it will be assumed that selector switch 34 is positioned to the left to display exhaust gas temperature information. Consequently, display 36 is illuminated. The operation of the monitoring system in the cylinder head temperature mode of operation with switch 34 in the cylinder head temperature position and display 38 illuminated will be identical to the discussion below.

In the automatic mode of operation, mode switch 30 is placed in the position opposite "A" on display 26. In the automatic mode of operation, all engine cylinders are automatically and constantly scanned. The digit displayed in display 40 displays the number corresponding to the cylinder operating with the hottest temperature. As shown in FIG. 2, cylinder number 4 is operating at the hottest temperature. The four digit display 42 displays the exhaust gas temperature of the cylinder whose number is being displayed by display 40. Therefore, combining displays 42 and 40, it can be seen that the exhaust gas temperature of cylinder 4 is 1450° F. Display 44 with indicator 54 illuminated indicates the temperature difference between the hottest and coldest exhaust gas temperature of the cylinders. Display 44 (FIG. 2) indicates that this temperature difference is 120° F meaning that one of the cylinders, the coldest, is operating with an exhaust gas temperature of 1330° F.

In the automatic mode of operation, the mode switch 32 can be switched to the "S" position. This actuation of switch 32 stores in the memory circuitry 22 (FIG. 1) the exhaust gas temperature of the hottest cylinder at the instant that the mode switch 32 is activated. This stored temperature or "reference temperature" will then be utilized by the monitoring system in subsequent calculations. The display 44 in this mode of operation will then indicate the temperature difference between the exhaust gas temperature of the hottest cylinder and the stored reference temperature. After actuation of switch 32, the threshold temperature value of the hot alarm indicator 48 will then equal the stored reference temperature. If indicator 48 is illuminated, the temperature displayed in display 44 indicates that the stored reference temperature has been exceeded by 120° F.

If the monitoring system is operating using a stored reference temperature, the indicator 52 will be illuminated to indicate that the temperature being displayed by display 44 relates to the stored reference temperature and not the coldest exhaust gas temperature. When a stored reference temperature is not used, indicator 54 will be illuminated to indicate that the temperature displayed by display 44 relates to the coldest exhaust gas temperature. It can therefore be seen that indicators 52 and 54 will never be illuminated at the same time since the temperature displayed by display 44 represents a difference variable depending upon the mode selected.

In the manual mode of operation of the temperature monitoring system, mode switch 30 is positioned opposite the "M" of display 26. The display 40 in the manual mode of operation indicates the number of the cylinder presently being monitored. Activation of mode switch 32 functions to step increment the engine cylinder under observation so that the operator can sequentially observe the temperature characteristics of each of the cylinders of an engine. The display 42 will display the exhaust gas temperature of the particular cylinder being monitored. The display 44 will indicate the temperature difference between the exhaust gas temperature of the cylinder being monitored and the hottest cylinder. Therefore, display 26 (FIG. 2) in the system's manual mode of operation indicates that cylinder 4 is being observed and has an exhaust gas temperature of 1450° F. Cylinder 4 is operating with an exhaust gas temperature of 120° F below the hottest exhaust gas temperature of a cylinder. If the operator were observing the cylinder with the hottest exhaust gas temperature, display 44 would indicate 000. In the manual mode of operation, indicators 52 and 54 are not illuminated.

The hot or cold alarms 48 and 50 can occur in any mode of operation. The operation of these alarms is controlled by the processor 20 (FIG. 1), which analyzes all cylinders regardless of the position of the mode switch 30. The threshold temperature of the hot alarm 48 is normally 1600° F (870° C). Illumination of indicator 48 will indicate that the exhaust gas temperature of one or more of the cylinders has exceeded a temperature of 1600° F. As previously discussed, the threshold temperature of the hot alarm 48 can be changed in the automatic mode of operation by activating mode switch 32 to replace the normal threshold temperature with the stored reference temperature. When the stored reference temperature is used as the threshold temperature, the hot alarm indicator 48 will then be illuminated only when an exhaust gas temperature of a cylinder exceeds the stored reference temperature. The cold alarm indicator 50 is illuminated when the difference between the hottest and coldest exhaust gas temperature exceeds one-half of the value of the hottest exhaust gas temperature. If the mode switch 32 has been actuated in the automatic mode of operation, indicator 50 is illuminated to indicate that the difference between the hottest and coldest exhaust gas temperature exceeds one-half of the value of the stored reference temperature, or that the coldest temperature has dropped below the reference temperature minus twice the difference between the hottest cylinder and the reference temperature, thus detecting an overall shift in the temperature pattern. Illumination of either of the hot or cold indicators 48 and 50 does not affect the condition or operation of the displays 40, 42 and 44.

Actuation of mode switch 32 to the "R" position on display 26 functions to reset the monitoring system. In particular, any stored reference temperature will be cleared from the system's memory and the automatic differential display mode will be reestablished. The microprocessor 20 will be cleared of the hottest temperature in both the automatic and manual modes of operation, and the hot alarm threshold will be reset to 1600° F. In the manual mode of operation, activating mode switch 32 to the reset position resets the cylinder being monitored to number 1 and clears the microprocessor 20.

Actuation of the mode switch 30 to the "T" position of display 26 will place the monitoring system in the turbine mode of operation to monitor turbine inlet gas temperatures in a manner similar to that described with respect to exhaust gas temperatures. The temperature monitoring system can also simultaneously monitor exhaust gas temperatures and cylinder head temperatures by placing the select switch 34 in the center position. The displays 40, 42 and 44 will then alternately display exhaust gas temperature and cylinder head temperature information corresponding with the illumination of displays 36 and 38.

Figure 3:
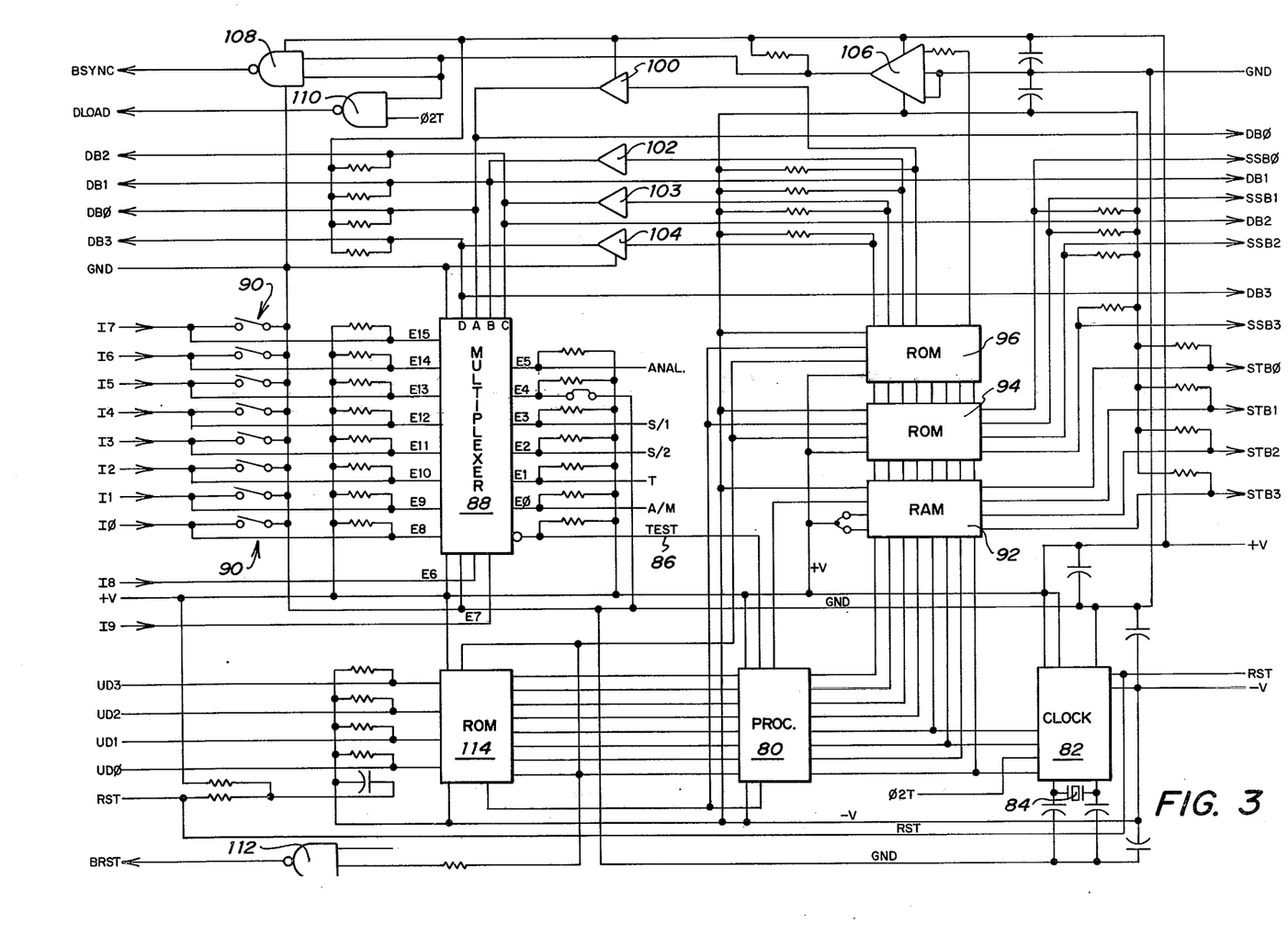
FIG. 3 is a detailed schematic diagram of the microprocessor and memory shown in the block diagram of FIG. 1.

Referring to FIG. 3, the schematic circuitry which corresponds to the block representing the microprocessor 20 and the block representing memory 22 (FIG. 1) is illustrated. A microprocessor 80 comprises a standard four-bit integrated circuit, such as a 4004 microprocessor manufactured by Intel. The microprocessor 80 is driven by a two-phase clock generator 82, which is interconnected to a crystal 84 to generate clock pulses. Clock generator 82 may comprise a standard integrated circuit, such as a 4201 I/C manufactured by Intel. Digital input to the microprocessor 80 is provided via signal line 86, which is interconnected to a multiplexer 88. Multiplexer 88 may comprise for example, a 74150 I/C manufactured by National Semiconductor.

Input signals I$\phi$-I7 are applied through switches 90 along signal lines E8-E15 to the multiplexer 88. The input signals I$\phi$-I7 provide external information regarding the number of engines and the configuration of the type of aircraft engine being monitored. Switches 90 are prestrapped in either an open or closed position depending upon the number and the external configuration of the aircraft engine. The multiplexer 88 reads the input signals appearing on signal lines E8-E15 upon initialization or reset of the monitoring system. A reset signal is applied via signal line E7 to the multiplexer 88.

Additional inputs to the multiplexer 88 include the "A/M" signal via signal line E$\phi$. This signal reflects the position of the mode switch 30 (FIG. 2) whether in the automatic or manual mode position. The "T" signal appearing on signal line E1 to the multiplexer 88 indicates to the multiplexer 88 that the mode switch 30 is in the turbine monitoring position. The S/2 and S/1 signals applied via signal lines E2 and E3 present a ground signal to the multiplexer 88 if the mode switch 32 of either a master or slave unit is being operated in the temperature monitoring system. The ANAL. signal applied via signal line E5 presents the current converted thermocouple probe temperatures from the output of the analog-to-digital converter 18 (FIG. 1). The operation of the analog-to-digital converter 18 will be subsequently described with reference to FIG. 4.

As previously stated, the single input to microprocessor 80 is via the "TEST" signal line 86, which is the output signal from the multiplexer 88. The output of microprocessor 80 is interconnected to a random-access-memory (RAM) 92. RAM 92 comprises a standard 3204-bit memory unit such as a 4002 I/C. RAM 92 stores the present converted thermocouple temperatures monitored by all of the thermocouple sensors. The temperature data stored in RAM 92 is therefore continuously changing to reflect the changing operating temperatures being monitored by sensor groups 10, 12 and 14 (FIG. 1). RAM 92 generates the STB $\phi$-3 signals, which are applied to the display 26 (FIG. 1).

RAM 92 is interconnected to a read only memory (ROM) 94, which is interconnected to a ROM 96. Read only memories 94 and 96 are control memories and may comprise a 256 8-bit, 512 words of memory such as a 4001 I/C manufactured by Intel. The memories of the ROMs 94 and 96 are unalterable and contain the program to scan the multiplexer 88 and determine the temperature and diagnostic information to be displayed on the display 26. The programming instruction definitions for a 4001 ROM manufactured by Intel Corporation including the mnemonic, operation, operand and description of the operation corresponding to a particular instruction are reproduced in Table I below. These instructions are found in the Intel Corporation publication entitled: *MCS-4 Microcomputer Set, Users Manual*, March 1974 (Rev. 5) at pages 16–17.

TABLE 1

[Those instructions preceded by an asterisk (*) are 2 word instructions that occupy 2 successive locations in ROM]
MACHINE INSTRUCTIONS (Logic 1=Low Voltage=Negative Voltage; Logic 0=High Voltage=Ground)

| MNEMONIC | OPR $D_3D_2D_1D_0$ | OPA $D_3D_2D_1D_0$ | DESCRIPTION OF OPERATION |
|---|---|---|---|
| NOP | 0 0 0 0 | 0 0 0 0 | No operation. |
| *JCN | 0 0 0 1 $A_2A_2A_2A_2$ | $C_1C_2C_3C_4$ $A_1A_1A_1A_1$ | Jump to ROM address $A_2A_2A_2A_2, A_1A_1A_1A_1$ (within the same ROM that contains this JCN instruction) if condition $C_1C_2C_3C_4$[1] is true, otherwise skip (go to the next instruction in sequence). |
| *FIM | 0 0 1 0 $D_2D_2D_2D_2$ | R R R 0 $D_1D_1D_1D_1$ | Fetch immediate (direct) from ROM Data $D_2, D_1$ to index register pair location RRR.[2] |
| SRC | 0 0 1 0 | R R R 1 | Send register control. Send the address (contents of index register pair RRR) to ROM and RAM at $X_2$ and $X_3$ time in the Instruction Cycle. |
| FIN | 0 0 1 1 | R R R 0 | Fetch indirect from ROM. Send contents of index register pair location 0 out as an address. Data fetched is placed into register pair location RRR. |
| JIN | 0 0 1 1 | R R R 1 | Jump indirect. Send contents of register pair RRR out as an address at $A_1$ and $A_2$ time in the Instruction Cycle. |
| *JUN | 0 1 0 0 $A_2A_2A_2A_2$ | $A_3A_3A_3A_3$ $A_1A_1A_1A_1$ | Jump unconditional to ROM address $A_3, A_2, A_1$. |
| *JMS | 0 1 0 1 $A_2A_2A_2A_2$ | $A_3A_3A_3A_3$ $A_1A_1A_1A_1$ | Jump to subroutine ROM address $A_3, A_2, A_1$, save old address. (Up 1 level in stack.) |
| INC | 0 1 1 0 | R R R R | Increment contents of register RRRR.[3] |
| *ISZ | 0 1 1 1 $A_2A_2A_2A_2$ | R R R R $A_1A_1A_1A_1$ | Increment contents of register RRRR. Go to ROM address $A_2, A_1$ (within the same ROM that contains this ISZ instruction) if result $\neq 0$, otherwise skip (go to the next instruction in sequence). |
| ADD | 1 0 0 0 | R R R R | Add contents of register RRRR to accumulator with carry. |
| SUB | 1 0 0 1 | R R R R | Subtract contents of register RRRR to accumulator with borrow. |
| LD | 1 0 1 0 | R R R R | Load contents of register RRRR to accumulator. |
| XCH | 1 0 1 1 | R R R R | Exchange contents of index register RRRR and accumulator. |
| BBL | 1 1 0 0 | D D D D | Branch back (down 1 level in stack) and load data DDDD to accumulator. |
| LDM | 1 1 0 1 | D D D D | Load data DDDD to accumulator. |

INPUT/OUTPUT AND RAM INSTRUCTIONS
(The RAM's and ROM's operated on in the I/O and RAM instructions have been previously selected by the last SCR instruction executed.)

| MNEMONIC | OPR $D_3D_2D_1D_0$ | OPA $D_3D_2D_1D_0$ | DESCRIPTION OF OPERATION |
|---|---|---|---|
| WRM | 1 1 1 0 | 0 0 0 0 | Write the contents of the accumulator into the previously selected RAM main memory character. |
| WMP | 1 1 1 0 | 0 0 0 1 | Write the contents of the accumulator into the previously selected RAM output port. (Output Lines) |
| WRR | 1 1 1 0 | 0 0 1 0 | Write the contents of the accumulator into the previously selected ROM output port. (I/O Lines) |
| WPM | 1 1 1 0 | 0 0 1 1 | Write the contents of the accumulator into the previously selected half byte of read/write program memory (for use with 4008/4009 only) |
| WR$\phi$[4] | 1 1 1 0 | 0 1 0 0 | Write the contents of the accumulator into the previously selected RAM status character 0. |
| WR1[4] | 1 1 1 0 | 0 1 0 1 | Write the contents of the accumulator into the previously selected RAM status character 1. |
| WR2[4] | 1 1 1 0 | 0 1 1 0 | Write the contents of the accumulator into the previously selected RAM status character 2. |
| WR3[4] | 1 1 1 0 | 0 1 1 1 | Write the contents of the accumulator into the previously selected RAM status character 3. |
| SBM | 1 1 1 0 | 1 0 0 0 | Subtract the previously selected RAM main memory character from accumulator with borrow. |
| RDM | 1 1 1 0 | 1 0 0 1 | Read the previously selected RAM main memory character into the accumulator. |
| RDR | 1 1 1 0 | 1 0 1 0 | Read the contents of the previously selected ROM input port into the accumulator. (I/O Lines) |
| ADM | 1 1 1 0 | 1 0 1 1 | Add the previously selected RAM main memory character to accumulator with carry. |
| RD$\phi$[4] | 1 1 1 0 | 1 1 0 0 | Read the previously selected RAM status character 0 into accumulator. |
| RD1[4] | 1 1 1 0 | 1 1 0 1 | Read the previously selected RAM status character 1 into accumulator. |
| RD2[4] | 1 1 1 0 | 1 1 1 0 | Read the previously selected RAM status character 2 into accumulator. |
| RD3[4] | 1 1 1 0 | 1 1 1 1 | Read the previously selected RAM status character 3 into accumulator. |

TABLE 1-continued

ACCUMULATOR GROUP INSTRUCTIONS

| | | | |
|---|---|---|---|
| CLB | 1 1 1 1 | 0 0 0 0 | Clear both. (Accumulator and carry) |
| CLC | 1 1 1 1 | 0 0 0 1 | Clear carry. |
| IAC | 1 1 1 1 | 0 0 1 0 | Increment accumulator. |
| CMC | 1 1 1 1 | 0 0 1 1 | Complement carry. |
| CMA | 1 1 1 1 | 0 1 0 0 | Complement accumulator. |
| RAL | 1 1 1 1 | 0 1 0 1 | Rotate left. (Accumulator and carry) |
| RAR | 1 1 1 1 | 0 1 1 0 | Rotate right. (Accumulator and carry) |
| TCC | 1 1 1 1 | 0 1 1 1 | Transmit carry to accumulator and clear carry. |
| DAC | 1 1 1 1 | 1 0 0 0 | Decrement accumulator. |
| TCS | 1 1 1 1 | 1 0 0 1 | Transfer carry subtract and clear carry. |
| STC | 1 1 1 1 | 1 0 1 0 | Set carry. |
| DAA | 1 1 1 1 | 1 0 1 1 | Decimal adjust accumulator. |
| KBP | 1 1 1 1 | 1 1 0 0 | Keyboard process. Converts the contents of the accumulator from a one out of four code to a binary code. |
| DCL | 1 1 1 1 | 1 1 0 1 | Designate command line. |

NOTES:
[1]The condition code is assigned as follows:
$C_1 = 1$ Invert jump condition
$C_2 = 1$ Jump if accumulator is zero
$C_4 = 1$ Jump if test signal is a 0
$C_1 = 0$ Not invert jump condition
$C_3 = 1$ Jump if carry/link is a 1
[2]RRR is the address of 1 of 8 index register pairs in the CPU.
[3]RRRR is the address of 1 of 16 index registers in the CPU.
[4]Each RAM chip has 4 registers, each with twenty 4-bit characters subdivided into 16 main memory characters and 4 status characters. Chip number, RAM register and main memory character are addressed by an SRC instruction. For the selected chip and register, however, status character locations are selected by the instruction code (OPA).

The program assembly for ROMS 94 and 96 is contained in Tables 2 and 3, in which: "ROM ADDRESS" designates the cell number of the 256 cells; "OPR" designates the operation and is represented by a mnemonics as defined in Table 1; "OPA" designates the operand of each instruction.

TABLE 2

(ROM 94)

| ROM ADDRESS | OPR | OPA |
|---|---|---|
| 1 | NOP | |
| 2 INIT | FIM | RP7 |
| 3 | F | E |
| 4 | LDM | E |
| 5 | XCH | 0 |
| 6 LLO | INC | E |
| 7 | LDM | A |
| 8 | SRC | 7 |
| 9 | WRM | |
| 10 | LDM | 1 |
| 11 | WR3 | |
| 12 | WR1 | |
| 13 | WR2 | |
| 14 | ISZ | 0 |
| 15 | | LL0 |
| 16 #OF CYL | FIM | RD0 |
| 17 | 2 | 0 |
| 18 | LDM | 8 |
| 19 | SRC | 4 |
| 20 | WRR | |
| 21 | LDM | 2 |
| 22 | JCN | TO |
| 23 | | AROUND IT |
| 24 | LDM | 0 |
| 25 AROUND IT | SRC | 0 |
| 26 | WRM | |
| 27 | NOP | |
| 28 | NOP | |
| 29 | NOP | |
| 30 | NOP | |
| 31 | NOP | |
| 32 | NOP | |
| 33 SEL E1 | FIM | RP7 |
| 34 | 0 | 0 |
| 35 DO IT | SRC | 4 |
| 36 GET LOOP | JMS | |
| 37 | | GET DATA |
| 38 | JMS | |
| 39 | | FHOC |
| 40 | LDM | 3 |
| 41 | WRR | |
| 42 | JCN | TO |
| 43 | | STPCYL 1 |
| 44 | LDM | 2 |
| 45 | WRR | |
| 46 | JCN | TO |
| 47 | | STPCYL 2 |
| 48 FINGT D | FIM | 0 |
| 49 | 2 | 0 |
| 50 | SRC | 0 |

TABLE 2-continued (ROM 94)

| ROM ADDRESS | OPR | OPA |
|---|---|---|
| 51 | CLB | |
| 52 | NOP | |
| 53 | XCH | F |
| 54 | RDM | |
| 55 | CRC | 7 |
| 56 | SBM | |
| 57 | JCN | AFO |
| 58 | | GET LOOP |
| 59 DONE | WRM | |
| 60 | FIM | RP6 |
| 61 | 2 | 3 |
| 62 | LD | E |
| 63 | JCN | A0 |
| 64 | | LLAR |
| 65 | FIM | RP6 |
| 66 | 2 | A |
| 67 LLAR | JMP | |
| 68 | | OPT PATCH |
| 69 BACK | WRR | |
| 70 | JCN | T1 |
| 71 | | AUTO |
| 72 SLOW SCAN | SRC | 7 |
| 73 | RD3 | |
| 74 | SRC | 6 |
| 75 | WRM | |
| 76 | INC | D |
| 77 | RAL | |
| 78 | DAC | |
| 79 | JMS | |
| 80 | | LOAD TEMP |
| 81 FIGURE SPAN | LD | F |
| 82 | DAC | |
| 83 | XCH | 5 |
| 84 | SRC | 7 |
| 85 | RD | 1 |
| 86 | SCH | 4 |
| 87 CRAM SPAN | JMS | |
| 88 | | COMPARE DATA |
| 89 | JMS | |
| 90 | | LOAD SPAN |
| 91 ALARM | LDM | A |
| 92 | CLC | |
| 93 | ADD | D |
| 94 | XCH | D |
| 95 | SRC | 6 |
| 96 | CLB | |
| 97 | WRM | |
| 98 TOO HOT | LDM | D |
| 99 | XCH | 4 |
| 100 | SRC | 7 |
| 101 | RD1 | |
| 102 | XCH | 5 |
| 103 | JMS | |
| 104 | | COMP DATA |
| 105 | JCN | C1 |
| 106 | | TOO COLD |
| 107 YES, TOO HOT | LDM | 4 |
| 108 | SRC | 6 |

TABLE 2-continued

| ROM ADDRESS | (ROM 94) OPR | OPA |
|---|---|---|
| 109 | WRM | |
| 110 TOO COLD? | SRC | 7 |
| 111 | RD1 | |
| 112 | XCH | 4 |
| 113 | RD2 | |
| 114 | XCH | 5 |
| 115 | JMS | |
| 116 | | COMP DATA |
| 117 | RD2 | |
| 118 | XCH | F |
| 119 | SRC | 7 |
| 120 | RDM | |
| 121 | SUB | 7 |
| 122 | CMC | |
| 123 | INC | F |
| 124 | SRC | 7 |
| 125 | RDM | |
| 126 | SUB | 6 |
| 127 | JCN | C1 |
| 128 | | STATUS ALARMS |
| 129 YES TOO COLD | LDM | 8 |
| 130 | CRC | |
| 131 | SRC | 6 |
| 132 | ADM | |
| 133 | WRM | |
| 134 STATUS ALARMS | SRC | 4 |
| 135 | CLB | |
| 136 | WRR | |
| 137 | JCN | TO |
| 138 | | TOGGLE ENGINE |
| 139 | IAC | |
| 140 | SRC | 6 |
| 141 | ADM | |
| 142 | WRM | |
| 143 | LDM | F |
| 144 | XCH | F |
| 145 | SRC | 7 |
| 146 | RDM | |
| 147 | JCN | AO |
| 148 | | TOGGLE ENGINE |
| 149 IMOR | SRC | 6 |
| 150 | LDM | 1 |
| 151 | ADM | |
| 152 | WRM | |
| 153 TOGGLE ENGINE | LDM | 9 |
| 154 | SRC | 4 |
| 155 | WRR | |
| 156 | JCN | TO |
| 157 | | SELECT E1 |
| 158 | LD | E |
| 159 | JCN | AFO |
| 160 | | SELECT E1 |
| 161 SELECT E2 | FIM | RP7 |
| 162 | 1 | 0 |
| 163 | JUN | |
| 164 | | DO IT |
| 165 | | |
| 166 | | |
| 167 | | |
| 168 | | |
| 169 | | |
| 170 STPCYL 1 | FIM | RP1 |
| 171 | 0 | D |
| 172 | JUN | |
| 173 | | AROUND |
| 174 STPCYL 2 | FIM | RP1 |
| 175 | 1 | D |
| 176 AROUND | SRC | 4 |
| 177 | LDM | 0 |
| 178 | WRR | |
| 179 | JCN | T1 |
| 180 | | SET REFCON |
| 181 STEP | SRC | 2 |
| 182 | RD3 | |
| 183 | IAC | |
| 184 | WR3 | |
| 185 | DAC | |
| 186 | FIM | RP0 |
| 187 | 2 | 0 |
| 188 | SRC | 0 |
| 189 | CLC | |
| 190 | SBM | |
| 191 | JCN | AFO |
| 192 | | DEBOUNCE |
| 193 | LDM | 1 |
| 194 | SRC | 1 |
| 195 | WR3 | |
| 196 DEBOUNCE | JMS | |
| 197 | | DVT |
| 198 | SRC | 4 |
| 199 | LDM | |

TABLE 2-continued

| ROM ADDRESS | (ROM 94) OPR | OPA |
|---|---|---|
| 200 | WRR | |
| 201 | JCN | TO |
| 202 | | DEBOUNCE |
| 203 | IAC | |
| 204 | WRR | |
| 205 | JCN | TO |
| 206 | | DEBOUNCE |
| 207 | JUN | |
| 208 | | FINGT D |
| 209 SET REFCON | JUN | |
| 210 | | SET REF |
| 211 AUTO | SRC | 7 |
| 212 | RD1 | |
| 213 | XCH | F |
| 214 | LD | F |
| 215 | IAC | |
| 216 | RAR | |
| 217 | SRC | 6 |
| 218 | WRM | |
| 219 | INC | D |
| 220 | JMS | |
| 221 | | LOAD TEMPT 1 |
| 222 | LDM | D |
| 223 | XCH | F |
| 224 | SRC | 7 |
| 225 | RD1 | |
| 226 | XCH | 5 |
| 227 | LDM | D |
| 228 | XCH | 4 |
| 229 | LDM | F |
| 230 | XCH | F |
| 231 | SRC | 7 |
| 232 | ROM | |
| 233 | JON | AFO |
| 234 | | CRAM SPAN |
| 235 TO COLDEST | RD2 | |
| 236 | XCH | 5 |
| 237 | XCH | 4 |
| 238 | JUN | |
| 239 | | CRAM SPAN |
| 240 SOURCE ON 1 | RAR | |
| 241 | ADM | |
| 242 SOURCE ON 2 | FIM | RPO |
| 243 | 1 | 0 |
| 244 | SRC | 0 |
| 245 | WRR | |
| 246 | BBL | |
| 247 OPT PATCH | SRC | 4 |
| 248 | LDM | A |
| 249 | WRR | |
| 250 | JCN | TO |
| 251 | | POINT 1 |
| 252 | CLB | |
| 253 | JUN | |
| 254 | | BACK |
| 255 POINT 1 | JUN | |
| 256 | | 200 |

TABLE 3

| ROM ADDRESS | (ROM 96) OPR | OPA |
|---|---|---|
| 1 B/BCD | LD | 6 |
| 2 | CMA | |
| 3 | XCH | 6 |
| 4 | LD | 7 |
| 5 | FIM | RP2 |
| 6 | D | F |
| 7 DAAC | INC | 5 |
| 8 | CLC | |
| 9 | DAA | |
| 10 | XCH | 0 |
| 11 | JCN | C0 |
| 12 | | CHOV |
| 13 | INC | 5 |
| 14 CHOV | XCH | 5 |
| 15 | CLC | |
| 16 | DAA | |
| 17 | JCN | C0 |
| 18 | | NEND |
| 19 | INC | 4 |
| 20 NEND | XCH | 5 |
| 21 END | STC | |
| 22 | LD | 0 |
| 23 | DAA | |
| 24 | ISZ | 6 |
| 25 | DAAC | |
| 26 | BBL | |
| 27 DELAY ITM | FIM | RP0 |

TABLE 3-continued
(ROM 96)

| ROM ADDRESS | OPR | OPA |
|---|---|---|
| 28 | 2 | 0 |
| 29 | SRC | 0 |
| 30 | RD | 0 |
| 31 | IAC | |
| 32 | WRO | |
| 33 | XCH | 3 |
| 34 | RDO | |
| 35 | XCH | 1 |
| 36 | SRC | 0 |
| 37 | RDM | |
| 38 | JUN | |
| 39 | | O/P DATA 2 |
| 40 OPDATA 1 | LD | 2 |
| 41 OPDATA 2 | SRC | 4 |
| 42 | WRR | |
| 43 | XCH | 2 |
| 44 | LD | 3 |
| 45 | CMA | |
| 46 | WMP | |
| 47 | CLB | |
| 48 | CMA | |
| 49 | JUN | |
| 50 | | PATCH OP |
| 51 DV II | FIM | R2 |
| 52 | E | F |
| 53 AGAIN | JMS | |
| 54 | | DELAY ITM |
| 55 | ISZ | 9 |
| 56 | | AGAIN |
| 57 | ISZ | 5 |
| 58 | | AGIN |
| 59 | ISZ | 4 |
| 60 | | AGAIN |
| 61 | BBL | A |
| 62 LOAD SPAN | JMS | |
| 63 | | B/BCD |
| 64 | SRC | 6 |
| 65 | JMS | |
| 66 | | LFD |
| 67 | LD | 5 |
| 68 | INC | D |
| 69 | SRC | 6 |
| 70 | WRM | |
| 71 | BBL | 0 |
| 72 LOAD TEMP | XCH | F |
| 73 LOAD TEMP 2 | SRC | 7 |
| 74 | RDM | |
| 75 | XCH | 7 |
| 76 | INC | F |
| 77 | SRC | 7 |
| 78 | RDM | |
| 79 | XCH | 6 |
| 80 | JMS | |
| 81 | | B/BCD |
| 82 | SRC | 6 |
| 83 | JMS | |
| 84 | | LFD |
| 85 | INC | D |
| 86 | SRC | 6 |
| 87 | LD | 5 |
| 88 | WRM | |
| 89 | INC | D |
| 90 | SRC | 6 |
| 91 | LD | 4 |
| 92 | WWRM | |
| 93 | INC | D |
| 94 | BBL | 0 |
| 95 GET DATA II | CLB | |
| 96 | JMS | |
| 97 | | SOURCE ON 2 |
| 98 LL1 | SRC | 4 |
| 99 | LDM | 5 |
| 100 | WRR | |
| 101 | JCN | T1 |
| 102 | | ON CYL |
| 103 | JMS | |
| 104 | | DELAY ITM |
| 105 | JUN | |
| 106 | | LL1 |
| 107 ON CYL | SRC | 7 |
| 108 | RDM | |
| 109 | IAC | |
| 110 | WRM | |
| 111 | RAL | |
| 112 | DAC | |
| 113 | XCH | F |
| 114 | CLB | |
| 115 | LD | E |
| 116 | RAR | |
| 117 | JMS | |
| 118 | | SOURCE ON 1 |
| 119 | JMS | |
| 120 | | DVT II |
| 121 BACK | FIM | RP2 |
| 122 | 0 | 0 |
| 123 | LDM | 0 |
| 124 | JMS | |
| 125 | | SOURCE ON 2 |
| 126 LOOP | JMS | |
| 127 | | DELAY ITM |
| 128 | | LDM5 |
| 129 | WRR | |
| 130 | ISZ | 5 |
| 131 | | LL3 |
| 132 | INC | 4 |
| 133 LL3 | JUN | TO |
| 134 | | LOOP |
| 135 | SRC | 7 |
| 136 | LD | 5 |
| 137 | WRM | |
| 138 | INC | F |
| 139 | LD | 4 |
| 140 | SRC | 7 |
| 141 | WRM | |
| 142 | LDM | 7 |
| 143 | JMS | |
| 144 | | SOURCE ON 2 |
| 145 THORE | JMS | |
| 146 | | DELAY ITM |
| 147 | ISZ | A |
| 148 | | THERE |
| 149 | BBL | 0 |
| 150 FHOC | LD | F |
| 151 | DAC | |
| 152 | XCH | 4 |
| 153 | SRC | 7 |
| 154 | RD | 1 |
| 155 | XCH | 5 |
| 156 | JMS | |
| 157 | | COMP DATA |
| 158 | JCN | C0 |
| 159 | | TEST COLD |
| 160 | LD | 4 |
| 161 | WR1 | |
| 162 TEST COLD | RD2 | |
| 163 | XCH | 5 |
| 164 | JMS | |
| 165 | | COMP DATA |
| 166 | JCN | C1 |
| 167 | | LEND |
| 168 | LD | 4 |
| 169 | WR2 | |
| 170 | WRC | 4 |
| 171 | BBL | 0 |
| 172 COMP DATA | LD | 4 |
| 173 | XCH | F |
| 174 | SRC | 7 |
| 175 | LD | 5 |
| 176 | XCH | F |
| 177 | CLB | |
| 178 | RDM | |
| 179 | SRC | 7 |
| 180 | SBM | |
| 181 | CMC | |
| 182 | XCH | 7 |
| 183 | LD | 4 |
| 184 | XCH | F |
| 185 | INC | F |
| 186 | SRC | 7 |
| 187 | LD | 5 |
| 188 | XCH | F |
| 189 | INC | F |
| 190 | RDM | |
| 191 | SRC | 7 |
| 192 | SBM | |
| 193 | JUN | |
| 194 | | PARCH CMPP |
| 195 SET REF | SRC | 1 |
| 196 | RD1 | |
| 197 | XCH | 3 |
| 198 | SRC | 1 |
| 199 | LDM | D |
| 200 | XCH | 3 |
| 201 | RDM | |
| 202 | SRC | 1 |
| 203 | WRM | |
| 204 | RD1 | |
| 205 | IAC | |
| 206 | XCH | 3 |
| 207 | SRC | 1 |
| 208 | LDM | E |
| 209 | XCH | 3 |

TABLE 3-continued

| | (ROM 96) | |
|---|---|---|
| ROM ADDRESS | OPR | OPA |
| 210 | ROM | |
| 211 | SRC | |
| 212 | WRM | 1 |
| 213 | INC | B |
| 214 | SRC | 1 |
| 215 | LDM | 1 |
| 216 | WRM | |
| 217 | JUN | |
| 218 | | DEBOUNCE |
| 219 PATCH CMPP | XCH | 6 |
| 220 | JCN | C1 |
| 221 | | AROUND |
| 222 | LD | 6 |
| 223 | CMA | |
| 224 | XCH | 6 |
| 225 | LD | 7 |
| 226 | CMA | |
| 227 | XCH | 7 |
| 228 | ISZ | 7 |
| 229 | | AROUND |
| 230 | INC | 6 |
| 231 AROUND | BBL | 0 |
| 232 | CLC | |
| 233 | LD | 0 |
| 234 | SBM | |
| 235 | JCN | C1 |
| 236 | | AROUND |
| 237 | CMA | |
| 238 | IAC | |
| 239 AROUND | DAC | |
| 240 | JUN | A = 0 |
| 241 | | WAS 1 |
| 242 | DAC | |
| 243 | JCN | A 0 |
| 244 | | OVERLAY |
| 245 | CLC | |
| 246 | LD | 0 |
| 247 | ADM | |
| 248 | RAR | |
| 249 | XCH | 0 |
| 250 OVERLAY | LD | 0 |
| 251 | WRM | |
| 252 WAS 1 | BBL | 0 |
| 253 PATCH O/P | NOP | |
| 254 | NOP | |
| 255 | WMP | |
| 256 | BBL | |

ROM 94 generates the SSB $\phi$-3 signals, which are applied to the analog-to-digital converter 18 (FIG. 1). The binary output of ROM 96 is carried on data buss lines DB$\phi$-DB3 and is applied through I/C buffer amplifiers 100, 102, 103 and 104 to the input terminals, A, B, C and D of the multiplexer 88. Therefore, the sixteen input signal lines E$\phi$-E15, of the multiplexer 88 are selectable through data buss lines DB$\phi$-DB3 under the control of ROM 96. Data buss lines DB$\phi$-DB3 can also be interconnected to an on-line printer to permanently record monitored temperatures of long periods of time.

ROM 96 is also interconnected to amplifier 106. Amplifier 106 is an I/C comparator such as an LM311 I/C manufactured by National Semiconductor. Amplifier 106 is interconnected to NAND gates 108 and 110 to generate the BSYNC and DLOAD synchronization signals. A third synchronization signal BRST is generated by clock 82 through NAND gate 112. These synchronization signals can be utilized to synchronize external units, which may extract temperature information from the monitoring system for processing, storage or display for other functions.

Microprocessor 80 may also be interconnected to a read only memory I/C114, which may comprise a standard 4001 I/C. ROM 114 and its associated circuitry is utilized for additional memory capacity for optional temperature monitoring, such as the monitoring of turbine output gas temperatures.

Figure 4:
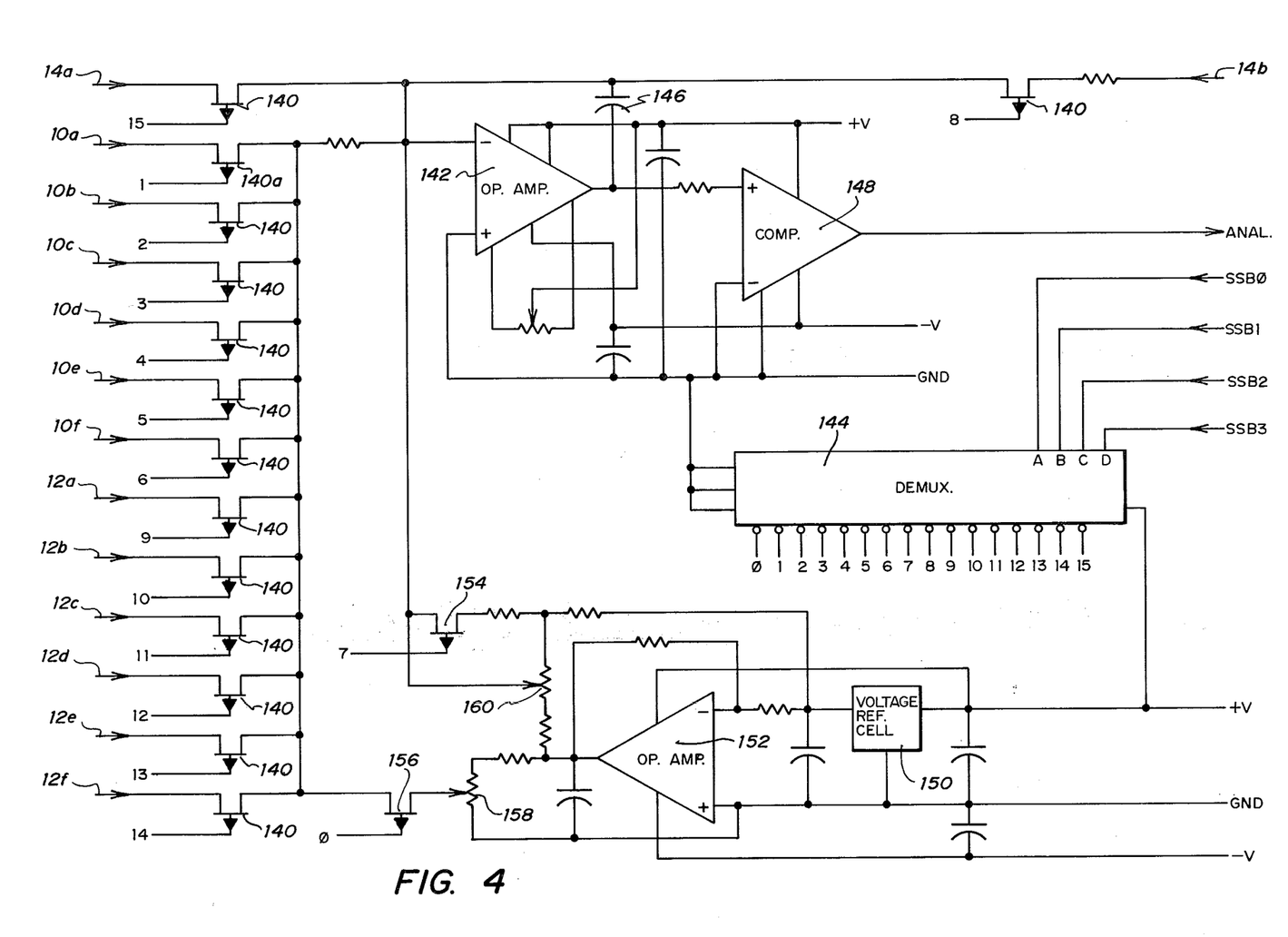
FIG. 4 is a schematic diagram of the analog-to-digital converter shown in the block diagram of FIG. 1.

Referring to FIG. 4, the circuitry representing a portion of the multiplexer block 16 and analog-to-digital converter block 18 of FIG. 1 is illustrated. The thermocouple sensors of sensor groups 10, 12 and 14 are directly connected to inputs of analog switches 140. The outputs of analog switches 140 are applied to the inverting input of operational amplifier 142. Operational amplifier 142 has a high input impedance and may comprise, for example, an LF355 amplifier manufactured by National Semiconductor. Analog switches 140 are selectively rendered conductive through operation of the demultiplexer 144. Demultiplexer may comprise a 74C154 I/C having output signal lines $\phi$-15 interconnected to analog switches 140. The sixteen output lines of demultiplexer 144 are selectable through terminals A, B, C and D which receive the output signals SSB$\phi$-3 generated by the ROM 94 (FIG. 3). Demultiplexer 144 therefore has as its input the four binary signal lines generated by ROM 94 to select one of its sixteen output lines.

Operational amplifier 142 functions as an integrator due to the connection of a capacitor 146 between the amplifier's output and inverting input. The output of amplifier 142 is interconnected to the non-inverting input of a voltage comparator amplifier 148 Voltage comparator 148 may comprise for example, an LM311 I/C manufactured by National Semiconductor. The output signal of comparator 148 represents the converted thermocouple temperatures, which are applied to the multiplexer 88 (FIG. 3) via the ANAL. signal line.

The analog-to-digital converter 18 operates as a dual slope converter. The reference ramp voltages are generated through a precision voltage reference cell 150 and an operational amplifier 152. Voltage reference cell 150 may comprise an AD580J I/C and operational amplifier 152 may comprise an LM741 I/C. In the preferred embodiment, voltage reference cell 150 maintains the applied voltage to operational amplifier 152 at a positive 2.5 volts. Operational amplifier 152 and its associated circuitry generates and maintains an output voltage of minus 2.5 volts. Amplifier 152 has a 1 to 1 negative gain ratio, so that if the output of the voltage reference cell 150 increases there will be a corresponding output voltage increase in the negative direction of amplifier 152. In this manner, the positive and negative voltages used in the analog-to-digital conversion process can track each other to maintain a constant voltage difference. In the preferred embodiment, this difference is five volts.

The application of the ramp voltage function to operational amplifier 142 is controlled by the operation of analog switch 154, which is actuated by the demultiplexer 144 along signal line 7 and analog switch 156, which is actuated through the demultiplexer 144 along signal line $\phi$. Interconnected to analog switch 156 is a variable resistor 158, which functions as a ramp voltage adjustment to establish a constant negative control voltage. This control voltage is typically a negative 57 millivolts. A variable resistor 160 is interconnected between the output of operational amplifier 152 and the input of operational amplifier 142 to function as a zero offset voltage control to enable the amplifiers 152 and 142 to track one another.

In operation of the analog-to-digital converter 18, before one of the analog switches 140 is actuated through operation of the demultiplexer 144, the counter of the microprocessor 80 (FIG. 3) must be set to zero. The demultiplexer 144 actuates analog switch 156 to apply a negative voltage source to operational amplifier 142 to drive the comparator 148 to a zero voltage reference level of operation. When the comparator 148 reaches a positive voltage level the demultiplexer 144 deactivates switch 156 and actuates switch 154 to apply a positive voltage source to operational amplifier 142 to drive the comparator 148 into a negative region of operation. After a predetermined time, which is controlled by the microprocessor 80, switches 154 and 156 will again reverse conduction, switch 154 turned "off" and switch 156 turned "on" to drive the voltage of the comparator 148 back to the zero reference level at which time the comparator 148 will change states to generate an output signal to initialize the counter of the microprocessor 80 to zero. When the comparator 148 voltage reaches the zero reference level, thermocouple 10a will be sampled.

The microprocessor 80 and ROM 94 output signals SSBφ-3 control the demultiplexer 144 to select and actuate switch 140a along signal line 1 to apply the voltage generated by thermocouple 10a to the operational amplifier 142. The sampled thermocouple output voltage, typically 30 millivolts, will drive the comparator 148 into the negative region of operation for a fixed period of time such as 50 milliseconds. At the end of this predetermined time period, the demultiplexer 144 will deactivate switch 140a and actuate switch 156 to apply the known source voltage generated by amplifier 152 to operational amplifier 142 to drive the operation of the comparator 148 into the positive region of operation. During the period of time necessary for the comparator 148 to again operate at the zero voltage reference level, the counter of the microprocessor 80 is counting number of cycles. The number of cycles counted by the microprocessor 80 from the time the switch 156 is actuated until the time the comparator reaches the zero voltage level and changes states, is approximately equal to the voltage necessary to drive the comparator 148 to the zero voltage level. This voltage is approximately equal to the original input voltage from the thermocouple 10a. A scale factor is then applied by the microprocessor 80 to the number of cycles counted to generate a value representing temperature. This generated temperature value is then stored in RAM 92. The fewer cycles counted by the microprocessor 80, the lower the temperature measured by a thermocouple.

After the comparator 148 has reached the zero voltage reference level, the counter resetting process is again started. Demultiplexer 144 actuates switch 154 to drive the comparator 148 into the negative region of operation. After a predetermined time, the demultiplexer 144 deactivates switch 154 and actuates switch 156 to drive the comparator 148 back to the zero reference level. Once the comparator 148 is operating at the zero reference level, switch 156 will be deactivated and the demultiplexer 144 will sample the second thermocouple 10b to repeat the conversion process for the voltage generated by thermocouple 10b. Each thermocouple will be sequentially sampled in a similar manner with the intervening resetting of the counter of the microprocessor 80 through the operation of switches 154 and 156. During the operation of switches 154 and 156 before a subsequent sampling of the thermocouple output voltage, the microprocessor 80 is calculating and storing in RAM 92 temperature information. The time required to convert each sensor temperature and transfer the converted temperature to memory is approximately one-tenth second.

Figure 5:
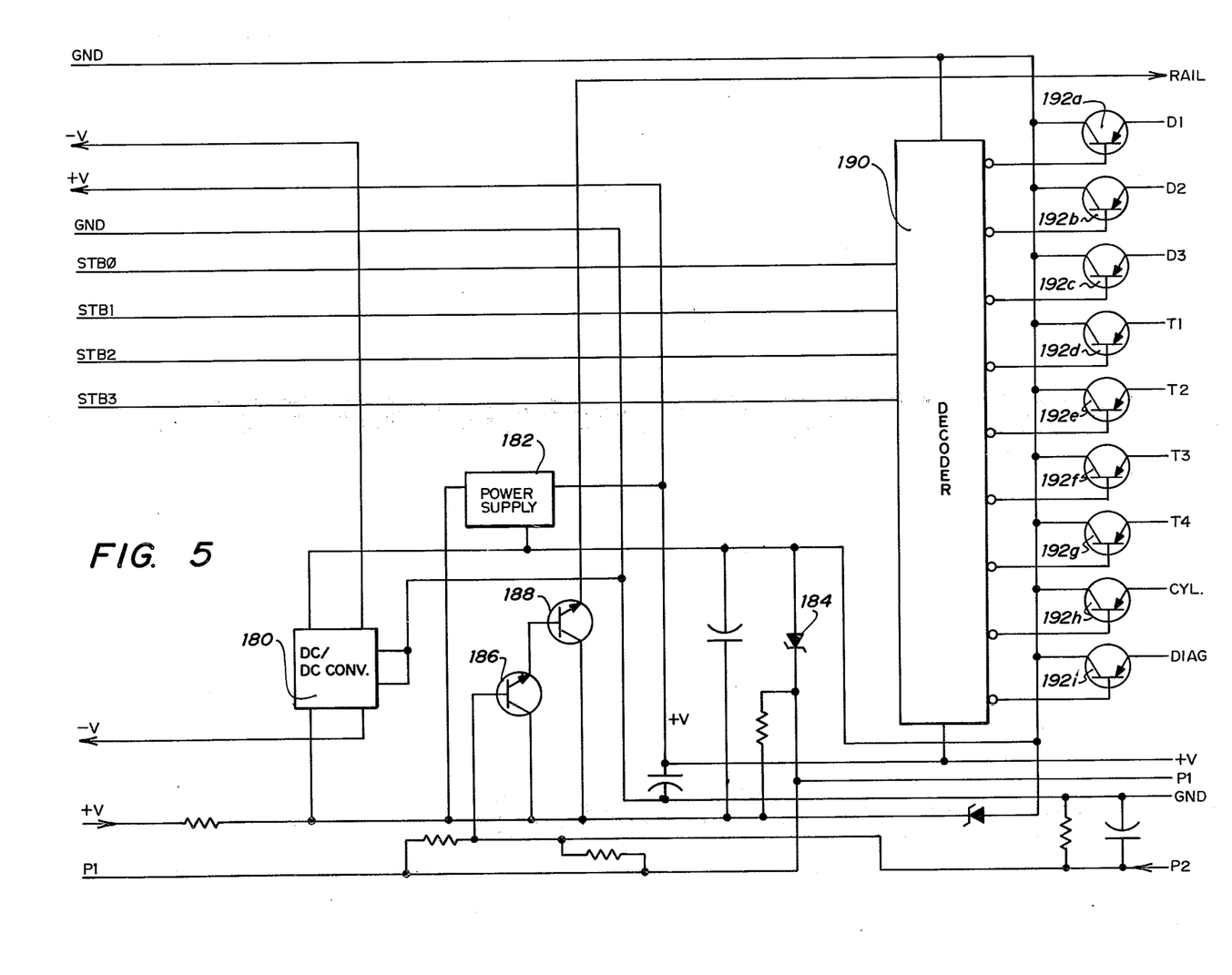
FIG. 5 is a schematic circuitry of the power supply and a portion of the display circuitry shown in the block diagram of FIG. 1.

Referring now to FIG. 5, the circuitry representing the power supply block 24 and a portion of the display circuitry represented by display block 26 (FIG. 1) is illustrated. The power supply 24 includes a converter 180 and a power supply 182. Converter 180 may comprise, for example, an SP5613 I/C and power supply 182 may comprise, for example, an LM323K I/C manufactured by National Semiconductor. Power supply 24 functions to generate a −10 volt and a ±5 volt source for operation of the temperature monitoring system upon application of a 12 volt source to the power supply 24.

As previously indicated, a photocell 56 (FIG. 2) is used to monitor the ambient light of the aircraft cabin. Power supply 182 through diode 184 and its associated components supplies the power for photocell 56 along voltage supply line P1. The output of photocell 56 is applied along signal line P2 to the base of transistor 186 (FIG. 5). The output of transistor 186 is applied to the base of transistor 188. The gain of transistor 188 is controlled by the output of transistor 186, which in turn is controlled by the output of photocell 56. Transistor 186 may comprise, for example, a 2N2219, NPN transistor and transistor 188 may comprise, for example, an NSP5190, NPN transistor. The output of transistor 188 is applied to the display 26 via the RAIL signal line. The RAIL signal is modulated such that in a low light environment, the voltage to display 26 decreases to decrease the display intensity, whereas in a bright light environment the RAIL voltage increases to increase the intensity of the displays.

Display 26 includes a decoder 190 which may comprise a 7445 I/C. The input to decoder 190 is generated by RAM 92 (FIG. 3), which generates the STBφ-3 signals. The output of decoder 190 is applied to the transistors 192a-i, which are interconnected to a light emitting diode array of the display 26. Transistors 192 may comprise, for example, 2N2905 PNP transistors. Transistors 192 when rendered "on" by the decoder 190 perform like switches to sink current from the light emitting diode arrays of displays 40, 42 and 44 to ground in order to actuate a particular array of the display 26. In particular, transistors 192a-c are interconnected via signal lines D1-D3 to the three light emitting diode arrays of display 44. The four transistors 192d-192g are interconnected to the four light emitting diode arrays of display 42 along signal lines T1-T4. Transistor 192h is interconnected to the light emitting diode array of display 40 via signal line CYL.

Figure 6:
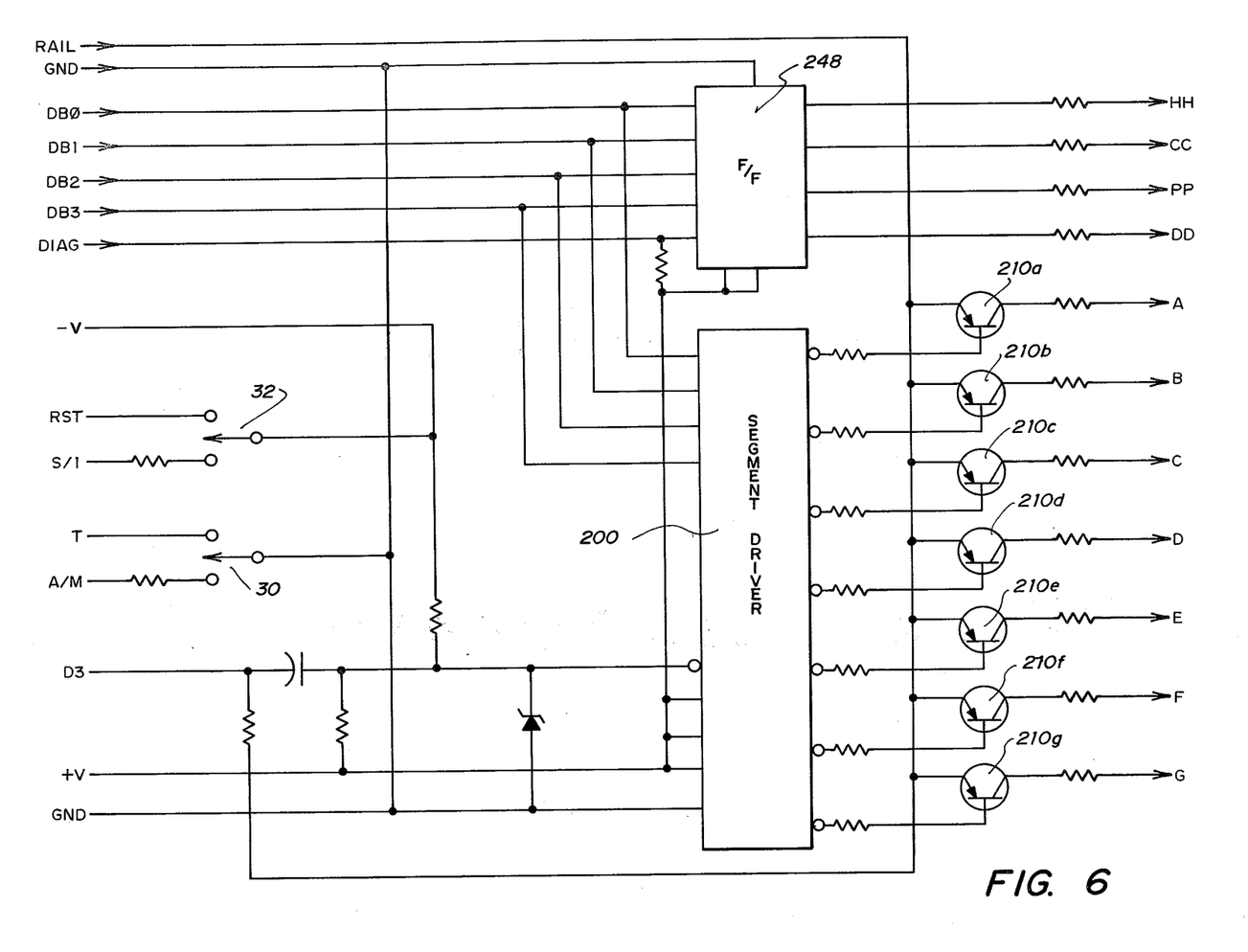
FIG. 6 is a schematic diagram of a portion of the display circuitry shown in the block diagram of FIG. 1.

The individual segments of the light emitting diode arrays of displays 40, 42 and 44 are actuated under the control of a segment driver 200 shown in FIG. 6. The segment driver 200 may comprise, for example, a 7447 I/C manufactured by National Semiconductor. The inputs to the segment driver 200 comprise the binary data generated by the ROM 96 (FIG. 3) via signal lines DBφ-3. The output of the segment driver 200 is applied to the transistors 210a-g, which may comprise, for example, 2N2907 PNP transistors. Transistors 200 are rendered conductive under the control of the segment driver 200 with the turn-on voltage being modulated by the RAIL signal, which in turn controls the intensity of the segments of the light emitting diode arrays.

Each one of the transistors 210 is interconnected to a particular segment of all of the light emitting diode arrays in the display 26. For example, transistor 210c is interconnected to each of the three light emitting diode arrays of the display 44, the four light emitting diode arrays of the display 42 and the single light emitting diode array of display 40 via signal line C, as shown in FIG. 7. Display 40 in FIG. 7 displays the numeral "4" with the light emitting diode array segments B, C, F and G illuminated through the conduction of transistors 210b, 210c, 210f and 210g.

The diagnostic displays 48, 50, 52 and 54 are illuminated by discrete light emitting diodes 220, 222, 224 and 246 illustrated in FIG. 7, which may comprise, for example, MV5077B light emitting diodes. Illumination of these discrete light emitting diodes is controlled by a flip-flop 248 (FIG. 6). Flip-flop 248 may comprise, for example, a 74175 QUAD D I/C manufactured by National Semiconductor. The input to flip-flop 248 comprises the data buss signals DBφ-3 generated by ROM 96 (FIG. 3) and the DIAG. signal generated by transistor 192i (FIG. 5). Flip-flop 248 is interconnected to diodes 220, 222, 224 and 226 via signal lines HH, CC, PP and DD.

It can therefore be seen that the individual light emitting diode arrays of the displays 40, 42 and 44 are controlled by the conduction of transistors 192 and the segment driver transistors 210. The diagnostic displays 48, 50, 52 and 54 are controlled by transistors 192i and the flip-flop 248. FIG. 6 also illustrates the mode switches 30 and 32, which provide inputs to the multiplexer 88 (FIG. 3).

Other embodiments of the present temperature monitoring system are also possible. For example, the microprocessing and memory circuits can be replaced with a fixed microcode processor an an erasable read only memory. The erasable read only memory will provide flexibility to provide several other features to the temperature monitoring system. The number of cylinders being monitored by the system can be increased such as to fourteen cylinders to monitor the engines of a DC-3 aircraft, the temperature can be displayed in degrees centigrade and optional features such as monitoring turbine exhaust gas temperatures can be included. In addition, memory circuits can be included to store temperatures over long periods of time. An on-line recorder can interface with the processor to produce a permanent record of the temperature over the duration of an aircraft flight. The permanent record can also include diagnostic code information to determine if the temperature of the engine is increasing too rapidly at take-off over several flights to indicate that the engine should be overhauled. The on-line recorder may comprise for example, a single cartridge to record up to one hundred hours of flight history. An overflow alarm can also be included to transfer data from the on-line recorder to an off-line station.

The present temperature monitoring system may also be utilized to monitor marine, locomotive and other stationary large engines where temperature control is critical. The diagnostic data generated and displayed by the system can also include an average of the temperatures of the various zones being monitored and an output temperature indicating the deviation of the individual zones from the average temperature, instead of a temperature difference between the hottest and coldest zones.

It may thus be seen that the present invention contemplates a temperature monitoring system for the automatic and sequential scanning of a plurality of temperature sensors located in different temperature monitoring zones of an aircraft engine. The monitoring system displays to the aircraft pilot the number of the cylinder with the hottest operating temperature, the actual engine zone being monitored and the difference between the hottest and coldest zone. The monitoring zones may comprise for example the cylinder heads of the aircraft engine, the exhaust pipes of the engine to monitor exhaust gas temperature or in an aircraft having a turbine engine or turbocharger, the pipes of the inlet to the turbines to monitor turbine inlet gas temperatures. The temperature monitoring system of the present invention further provides diagnostic information to indicate to the pilot if a predetermined hot or cold threshold temperature has been exceeded in the temperature monitoring zones being observed.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A monitoring device for monitoring thermal operating characteristics of an engine including turbine and piston engines comprising:

a first plurality of thermocouples located in first temperature monitoring zones within the engine for measuring the temperature of said first temperature monitoring zones and for generating corresponding first temperature output signals;

a second plurality of thermocouples located in second temperature monitoring zones within the engine for measuring the temperature of said second temperature monitoring zones and for generating corresponding second temperature output signals;

a third plurality of thermocouples located in third temperature monitoring zones within the engine for measuring the temperature of said third temperature monitoring zones and for generating corresponding third temperature output signals;

a multiplexing circuit for automatically and sequentially scanning and detecting said first, second and third temperature output signals;

means for converting said scanned temperature output signals to digital information;

an electronic processor for continuously generating a first temperature difference signal representing the temperature difference between the hottest and coldest zone of said first temperature monitoring zones, a second temperature difference signal representing the temperature difference between the hottest and coldest zone within said second temperature monitoring zones and a third temperature difference signal representing the temperature difference between the hottest and coldest zone within said third temperature monitoring zones;

means for storing said digital information and said first, second and third temperature difference signals;

first display means for alternately displaying the number of the temperature monitoring zone within said first, second and third temperature monitoring zones having the hottest temperature;

second display means for alternately displaying said first, second and third temperature difference signals; and third display means for alternately displaying the temperature of the hottest zone within said first, second and third temperature monitoring zones.

2. The monitoring device of claim 1 wherein said first temperature monitoring zones comprise the exhaust pipes of the engine cylinders, such that said first plurality of thermocouples measure the exhaust gas temperature of each of the engine cylinders.

3. The monitoring device of claim 2 wherein said first display means displays the number of the engine cylinder having the hottest temperature, said second display means displays the temperature difference between the exhaust gas temperature of the hottest and coldest engine cylinders and said third display means displays the exhaust gas temperature of the engine cylinder having the hottest temperature.

4. The monitoring device of claim 2 and further including means for generating an alarm signal if the temperature of the exhaust gas of the hottest engine cylinder exceeds a predetermined temperature value stored in said electronic processor.

5. The monitoring device of claim 2 and further including means for generating an alarm signal if the temperature of the exhaust gas of the coldest engine cylinder is less than a predetermined temperature value stored in said electronic processor.

6. The monitoring device of claim 1 wherein said second temperature monitoring zones comprise the cylinder heads of the engine cylinders, such that said second plurality of thermocouples measure the cylinder head temperature of each of the engine cylinders.

7. The monitoring device of claim 6 wherein said first display means displays the number of the engine cylinder having the hottest cylinder head temperature, said second display means displays the temperature difference between the hottest and coldest cylinder head temperatures of the engine cylinders and said third display means displays the temperature of the cylinder head having the hottest temperature.

8. The monitoring device of claim 1 and further including switch means for selecting any of said alternate display means.

9. The monitoring device of claim 1 wherein said third plurality of temperature monitoring zones comprise the inlet pipes of the turbines of the engine, such that said third plurality of thermocouples measure the turbine inlet gas temperature of the engine.

10. The monitoring device of claim 9 wherein said first display means indicates the turbine having the hottest temperature, said second display means displays the temperature difference between the turbine inlet gas temperature of the hottest and coldest turbines and said third display means displays the turbine inlet temperature of the turbine having the hottest temperature.

11. The monitoring device of claim 1 and further including:
means for recording said temperature output signals.

12. A method of monitoring thermal operating characteristics of an aircraft engine comprising the steps of:
sensing the temperature of a first, second and third plurality of temperature monitoring zones within the engine;
generating first, second and third electrical sensor output signals proportional to the temperature of the corresponding first, second and third plurality of temperature monitoring zones;
converting said scanned temperature output signals to digital information;
automatically and sequentially scanning and detecting said electrical sensor output signals;
processing said detected electrical sensor output signals;
generating first, second and third temperature difference signals representing the temperature difference between the hottest and coldest temperature within said first, second and third plurality of temperature monitoring zones; and
displaying said temperature difference signals.

13. The method of claim 12 and further including displaying the number of the temperature monitoring zone within said first, second and third plurality of temperature monitoring zones having the hottest temperature.

14. The method of claim 12 and further including:
displaying the temperature of the temperature monitoring zone within said first, second and third plurality of temperature monitoring zones having the hottest temperature.

15. The method of claim 12 and further including:
generating an alarm signal if the temperature of the hottest temperature monitoring zone exceeds a predetermined temperature value.

16. The method of claim 12 and further including:
generating an alarm signal if the temperature of the coldest temperature monitoring zone is less than a predetermined temperature value.

17. The method of claim 12 and further including:
recording said temperatures corresponding to the temperatures of said monitoring zones and said temperature difference signals.

18. The method of claim 12 wherein the step of sensing the temperature of said first, second and third plurality of temperature monitoring zones comprises:
sensing the temperature of a plurality of engine cylinder heads within the engine;
sensing the temperature of the exhaust gas of the engine cylinders; and
sensing the turbine inlet temperature of the engine.

19. The monitoring device of claim 1 and further including switch means for inputting a predetermined temperature value into said electronic processor.

20. The monitoring device of claim 19 wherein said predetermined temperature value equals the temperature of the hottest temperature monitoring zone within one of said first, second and third temperature monitoring zones at the time said switch means is actuated.

21. The monitoring device of claim 20 wherein said electronic processor generates a signal representing the temperature difference between the temperature monitoring zone within one of said first, second and third temperature monitoring zones having the hottest temperature and said predetermined temperature value.

22. The monitoring device of claim 21 and further including means for generating an alarm signal if the temperature monitoring zone within one of said first, second and third temperature monitoring zones having the hottest temperature exceeds said predetermined temperature value.

23. The monitoring device of claim 1 and further including switch means for manually sequentially scanning said thermocouple temperature output signals.

24. The monitoring device of claim 1 and further including an ambient light sensor for controlling the intensity of said displays.

* * * * *

UNITED STATES PATENT AND TRADEMARK OFFICE
CERTIFICATE OF CORRECTION

PATENT NO. : 4,114,442
DATED : September 19, 1978
INVENTOR(S) : Wayne L. Pratt

It is certified that error appears in the above-identified patent and that said Letters Patent are hereby corrected as shown below:

Column 13, line 21, change "51 DV II" to --51 DVT II--;
Column 13, line 26, change "AGIN" to --AGAIN--;
Column 13, line 50, change "WWRM" to --WRM--;
Column 14, line 41, change "WRC" to --SRC--;
Column 14, line 57, change "PARCH CMPP" to --PATCH CMPP--;
Column 15, line 5, under "OPA" column add --1--;
Column 15, line 6, after "WRM" under "OPA" column delete "1";
Column 15, line 28, change "A 0" to --A ≠ 0--;
Column 19, line 31, change "an" first occurrence to --and--.

Signed and Sealed this

Eighth Day of May 1979

[SEAL]

Attest:

RUTH C. MASON
Attesting Officer

DONALD W. BANNER
Commissioner of Patents and Trademarks